Nov. 8, 1966   P. F. KING ET AL   3,283,651
INFORMATION ENCODING DEVICE
Filed May 15, 1964   4 Sheets-Sheet 4

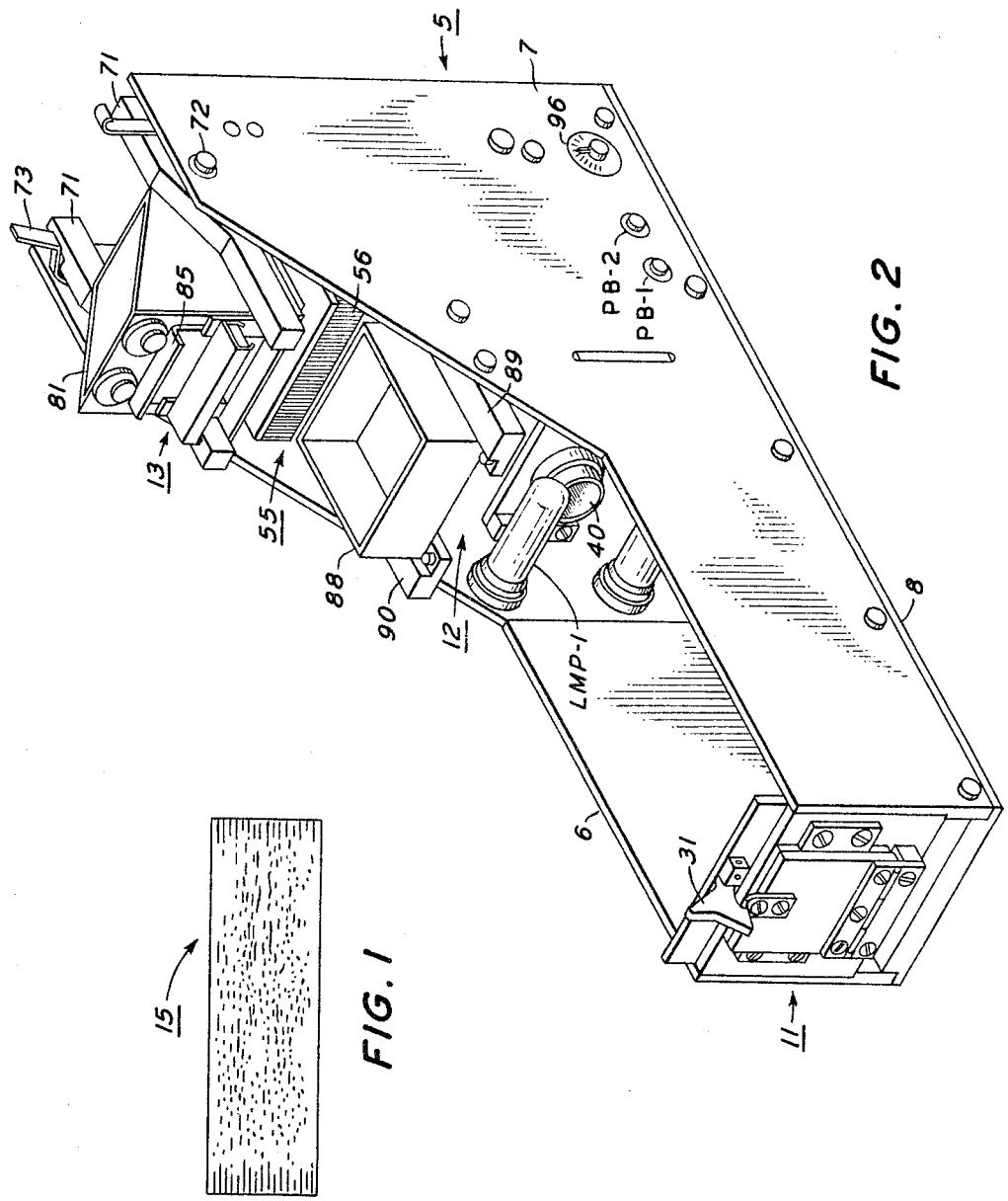

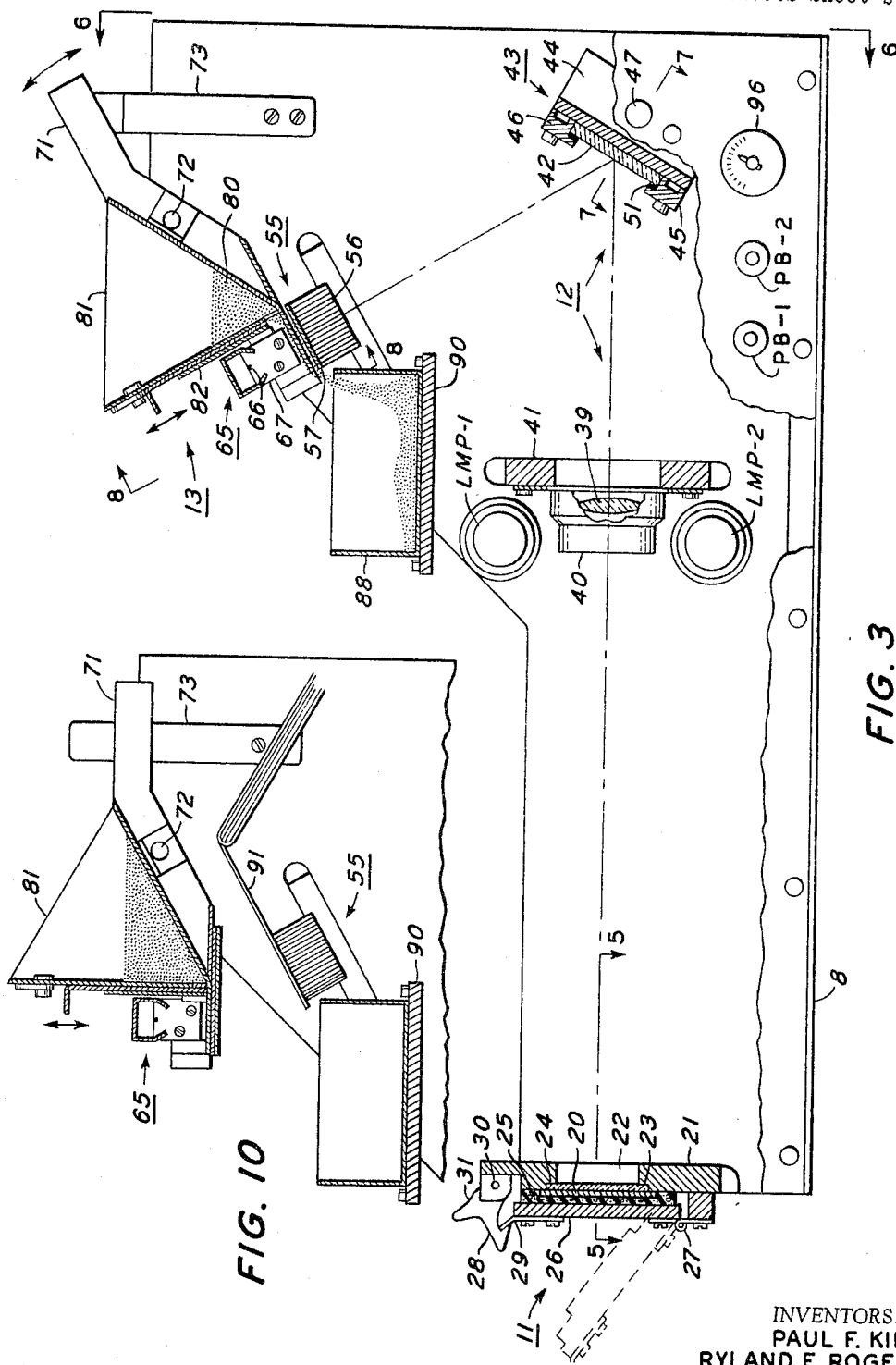

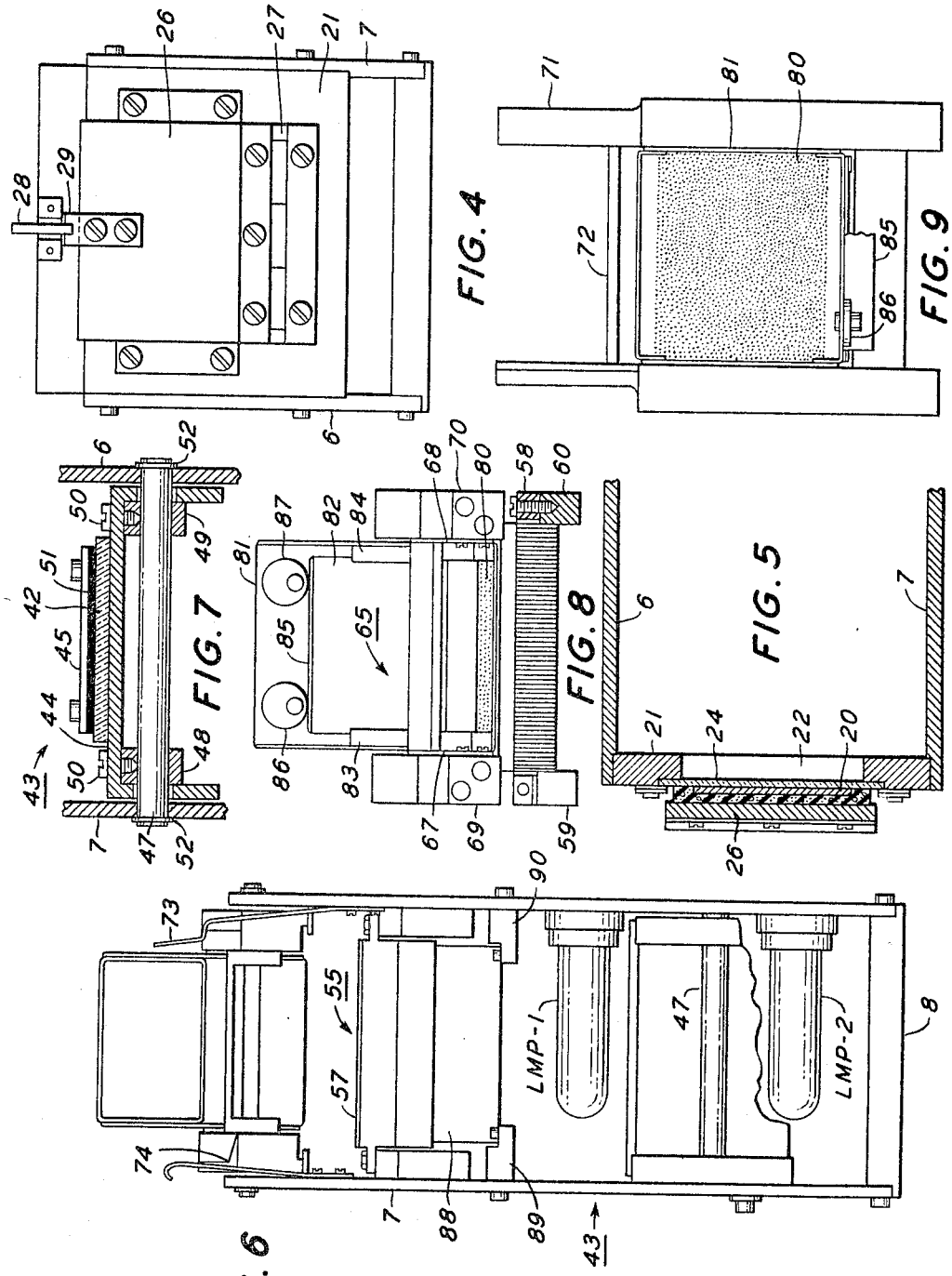

INVENTORS.
PAUL F. KING
RYLAND F. ROGERS
BY
ATTORNEYS

United States Patent Office 3,283,651
Patented Nov. 8, 1966

3,283,651
INFORMATION ENCODING DEVICE
Paul F. King and Ryland F. Rogers, West Webster, N.Y., assignors to Xerox Corporation, Rochester, N.Y., a corporation of New York
Filed May 15, 1964, Ser. No. 367,618
8 Claims. (Cl. 88—24)

This invention relates to novel method and apparatus for encoding graphic information onto a support sheet. More particularly, the invention relates to novel xerographic apparatus for encoding information from an original such as a signature bearing document onto the cover or sheet of a bank passbook or the like.

In today's business world, there is an ever-increasing need for transmitting graphic information in codified form in order to render difficult its comprehension by an intermediate carrier. At the same time, it is preferable that the coded information lend itself to convenient and rapid decodification by the intended recipient to enable use of the information consummate with the requirement of its utility. Typically, an application therefore would be to contain a codified withdrawal signature on a bank passbook that could easily and rapidly be decodified for recognition by a bank teller preferably without having to leave the teller's cage.

As is common in commercial banking practice, an account holder for the withdrawal of funds submits his passbook along with a signed withdrawal form to a teller whose job it is to verify the signature on the withdrawal form. The signature check consumes anywheres up to two minutes of teller's time while he refers to some form of a central file for the signature verification. This represents a substantial time loss in the handling of bank patronage, the alternative to which is to contain the signature directly on the passbook. This latter method has not won too much favor, but rather is considered impractical because of the increased danger of forgery and the added legal liability imposed thereby upon the banking institution. At the same time, large institutions, having numerous branch offices, have limited the account holder to withdrawals at a single branch or office in order to avoid duplication of signature files.

In accordance with the instant invention, there is provided novel method and apparatus by which graphic information such as a signature can conveniently and rapidly be encoded onto a support such as a bankbook and which can conveniently and even more rapidly be decoded by an inexpensive optical decoding unit contained in a teller's cage. As can be appreciated, the results of this system realize a substantial saving in teller's time as compared to prior known systems as to effect a substantially increased efficiency in the handling of patronage which in turn amounts to a substantial economic saving to the banking institution. In addition, where similar decoding units are contained at all branch offices, withdrawals, certification, or the like are simplified to the extent that the account holder can indiscriminately select the branch affording him maximum current convenience without regard as to where his records are kept.

It is therefore an object of the invention to provide novel method and apparatus for reproducing graphic information in encoded form onto a support surface.

It is a further object of the invention to provide novel method and apparatus for reproducing a signature or the like in scrambled encodified form onto a support on which it can be easily and rapidly decodified for recognition purposes.

It is a still further object of the invention to employ xerographic techniques to effect optically discernible encodification of graphic information onto bank passbooks or the like.

These and other objects will appear clearly in the following specification when read in connection with the following drawings, the novel features being pointed out in the claims at the end of the specification.

In the drawings:

FIG. 1 represents a signature type reproduction in encodified form in accordance with the invention;

FIG. 2 is an isometric top side view of a xerographic encoding apparatus embodiment;

FIG. 3 is a side sectional elevation through the apparatus of FIG. 1;

FIG. 4 is a front elevation of the copyholder;

FIG. 5 is a section through the copyholder taken along the lines 5—5 of FIG. 3;

FIG. 6 is a rear sectional elevation along the lines 6—6 of FIG. 3 with the xerographic station shown in its uppermost position;

FIG. 7 is a sectional view of the mirror mount taken along the lines 7—7 of FIG. 3;

FIG. 8 is a front elevation of the xerographic charging and developing units taken from the position 8—8 of FIG. 3;

FIG. 9 is a top plan view of the xerographic charging and developing apparatus;

FIG. 10 is a fragmentary elevation of the apparatus positioned for placing an image receiving sheet in transfer position;

Figure 11:
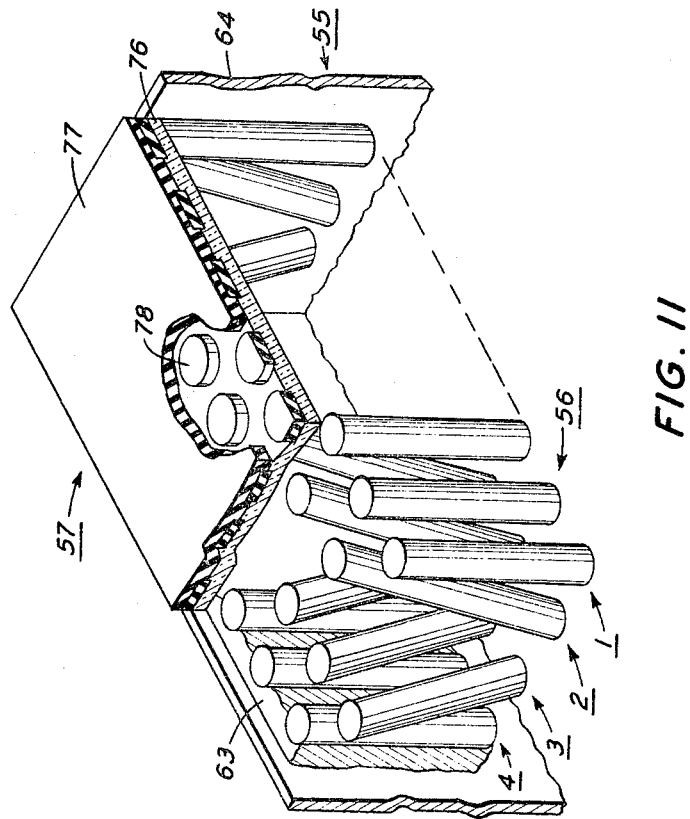
FIG. 11 is an isometric exploded view partially broken away of an optical information scrambling unit contained therein.

The apparatus to be described employs the process of xerography as disclosed for example, in Carlson Patent 2,297,691 issued October 6, 1942 in which a xerographic plate comprising a layer of photoconductive insulating material on a conductive backing is given a uniform electric charge over its surface and is then exposed to the subject matter to be reproduced. This exposure discharges the plate areas in accordance with the radiation intensity that reaches them, and thereby creates an electrostatic latent image on or in the photoconductive layer. Development of the latent image is effected with an electrostatically charged, finely divided material such as an electroscopic powder that is brought into surface contact with the photoconductive layer and is held thereon electrostatically in a pattern corresponding to the electrostatic latent image. Thereafter, the developed image is usually transferred to a support surface to which it may be fixed by any suitable means.

As shown in FIG. 1, there is illustrated in full size a scrambled encoded signature in the form of scattered dots or lines designated 15 as will be reproduced by the apparatus hereof.

The apparatus will now be described beginning with FIG. 2 by which, in accordance with the invention, is adapted to reproduce in encoded or "scrambled" form, information contained on an original document. As there shown, the apparatus comprises a generally elongated housing 5 formed of side walls 6 and 7 and a bottom plate 8. The housing supports and encloses additional operative elements including a copyholder 11 in the front of the housing (as viewed in FIG. 2) for supporting a document containing an original graphic image in the object plane of an optical path, an optical system generally designated 12, and a xerographic reproduction system generally designated 13. As will be understood, the apparatus is intended to be operated in the absence of ambient illumination. When it is preferred to operate the unit with the presence of ambient light, additional walls can be added to render the unit substantially light-tight.

For an understanding of the apparatus in order to produce a scrambled signature of the type illustrated in FIG. 1, reference is made further to FIGS. 3, 4 and 5. As can be seen, a copy or document original 20 is placed in copyholder 11 comprising a frame 21 secured between the side walls of housing 5, a clear aperture opening 22 defined in the frame and a shoulder recess 23 extending about the frame in which is mounted a glass platen 24 centered relative to the optical axis of optical system 12. Copy 20 is supported in tight surface engagement against platen 24 with the image side facing inward of aperture 22 and is maintained in this position during the time of its reproduction by means of a back support that includes a resilient backing layer 25, of sponge rubber or the like, secured to a firm relatively rigid backing 26 about ⅛″ sheet metal or the like. To insert or remove the copy, the back support is supported at its lower end on a pivot hinge 27 secured to the frame and at its upper end by means of a latch 28 adapted to engage a flange 29 extending rearward from backing plate 26. Latch 28 is mounted on a resilient pivot 30 and includes a finger extension 31 by which an operator can depress the latch clockwise to pivot it upward and effect release of the back support. The back support can then be pivoted downward about hinge 27 to the position shown dashed in FIG. 3 for removal and/or insertion of copy 20.

With copy in the copyholder, it is positioned in the object plane of optical system 12 (FIGS. 3 and 7) which is adapted to effect reflex projection of the image contained thereon by means of an objective lens 39 supported in a lens mount 40 held firm by a bracket support 41. To illuminate the copy image for projection, there is provided a pair of reflector contained lamps LMP-1 and LMP-2 arranged on opposite sides of lens 39. The lens projected image is optically transmitted onto a reflecting mirror 42 arranged with its mirror surface angularly offset from the lens axis and secured in its mount 43 which includes a channel 44 against which the mirror is secured by blocks 45 and 46 containing a resilient gasket 51. The channel is mounted via bores in the side rails onto a stationary rod 47 held in the housing side walls by retainer rings 52 and permitting angular adjustment of the mirror surface relative to the optical axis of lens 39 by pivoting thereabout. Set screws 50 extending through the channel into bushings 48 and 49 against rod 47, enable locking of the adjusted setting.

The image reflected from the surface of mirror 42 is directed into the image scrambling device 55 in the form of a block as will be more fully described in connection with FIGS. 11, 12 and 13. Generally the block comprises a plurality of closely-spaced, small diameter fiber optical pipes 56 (FIG. 3) extending generally in the direction of optical transmission and supporting along their topmost ends a xerographic plate 57. Block 55 is secured via a spring biased clamp 58 (FIG. 8) extending thereabout and adapted in turn to be supported on oppositely arranged adjustable ledge members 59 and 60 attached to the inside surface of side walls 6 and 7. As will be understood, the photoconductive surface of xerographic plate 57 lies in a plane substantially perpendicular to the axis of optical transmission emanating from mirror 42.

The xerographic processing station 13 includes the xerographic plate 57 and can be understood by referring to FIGS. 3, 6, 8, 9 and 10. For applying a uniform electrostatic charge to photoconductive surface of plate 57 there is provided a corona generating device 65, which may be of a type disclosed in Vyverberg patent U.S. 2,836,725, connected to a suitable high potential source and adapted when energized to emit corona charge from an electrode wire 66. The corona generating device is supported approximately 1″ above the surface of plate 57 via opposite brackets 67 and 68 connected respectively to electrically insulating blocks 69 and 70. These blocks in turn are mounted on a pair of oppositely extending arms 71 adapted to pivot about a pin 72 from a normal weighted position at which it is retained by spring clip 74 to an uppermost position defined by a leaf spring limit stop 73 as shown in FIGS. 6 and 10.

Exposure of copy 20 through the optical system 12 to the charged plate forms an electrostatic latent image thereon corresponding electrically, for example, to the pattern illustrated in FIG. 1. The image is then developed by means of a two-component electroscopic developer 80, which may be of a type described in Walkup and Wise patent U.S. 2,638,416, and contained in a hopper 81 also supported on arms 71. The front of the hopper includes a reciprocably operable gate member 82 holding developer in the hopper and adapted for vertical sliding in parallel guideways 83 and 84. Sliding the gate upward to the position shown in FIG. 3 releases developer from the hopper and for this purpose includes a turnedover flange 85 that can be finger gripped in order to lift the gate to a maximum position defined by adjustable eccentrics 86 and 87. By rotating the eccentrics about their respective end supports, the maximum raised position of the gate can be adjustably set.

On raising the gate, as aforesaid, developer contained in the lower portion of the hopper gravitationally escapes therefrom as shown in FIG. 3 in a manner to cascade over the image bearing photoconductive surface of plate 57 into a receiving bin 88 supported on platforms 89 and 90. Developer is permitted to flow until a predetermined quantity has passed over the plate to effect image development after which the gate is dropped.

Following development, arms 71 are depressed as to rotate in a clockwise direction to raise the entire unit supported thereby from the vicinity of the xerographic plate on the encoding unit 55 to the position shown in FIG. 10. A receiving support surface 91 on which the reproduction is to be transferred, such as a bank passbook or the like, is then placed superposed over the developed image. With this relation, arms 71 are then rotated counterclockwise to return the unit to its normal position placing corona generator 65 into the relation occupied in FIG. 3. By energizing corona wire 66, an electrostatic transfer, as is known in the art, is effected from the surface of the photoconductor onto the page or cover of the bankbook 91. After transfer, arms 71 are again rotated clockwise and the bank book is removed to a suitable vapor or heat fusing unit as is known in the art. This, then effects the scrambled image formation of the type illustrated in FIG. 1 whereupon the bankbook can be issued to the customer whose account is represented thereby.

Alternatively, instead of electrostatic transfer, the technique of adhesive transfer can be employed in which a transparent adhesive tape such as "Scotch Brand" can be applied to remove the developed image from the xerographic plate. This method enables placing the transferred image directly onto the receiving surface and offers the further advantage of omitting subsequent fusing while the tape provides a protective overlay to protect the image which could otherwise become scratched or destroyed from continuous use.

Figure 12:
FIG. 12 is a bottom view of the scrambling unit shown in FIG. 11.
Figure 13:
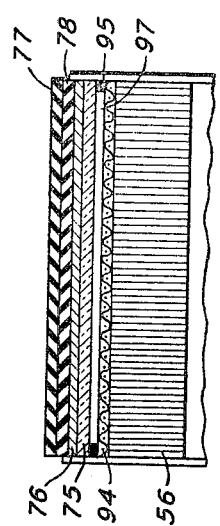
FIG. 13 is a sectional view illustrating an alternate construction to the embodiment of FIG. 11.

Refer now specifically to FIGS. 11, 12 and 13 in which different embodiments exemplifying the scrambling unit 55 are illustrated. Common to each of the embodiments are a plurality of optical fibers 56 embodied in a firm binder material 63. The individual fibers are arranged in close contiguous relation to each other and in a series of rows forming a width dimension at least the height dimension of information such as a signature to be recorded. In order to effect scrambling of the received optical image, some of the fibers are angularly displaced in a predetermined arrangement with relation to others of the fibers in a manner effecting optical distortion of at least portions of the optically transmitted image. Many such arrangemnts can be utilized, the only limitation being to avoid overlapping of the image information which would be later undiscernible on decoding. Accordingly, once determined, the arrangement is maintained compatible with a decodifier manufactured for use in conjunction with readout. One such arrangement found suitable and preferred for the purpose herein described is to arrange the fibers in rows extending in parallel planes in one direction, as for example, lengthwise in the general direction of optical transmission with each adjacent row angularly displaced from the vertical, a different degree emanating from the bottom.

The following preferred embodiments illustrated in the drawings include fibers of about one inch long and 0.01 inch in diameter embodied in a binder material 63 and about which extends a box-like container 64 to form a block of about 1 5/16 inches by 5 inches. This size has proven ample for all signature sizes likely to be encountered. A first row of fibers, designated 1, extends lengthwise of the block and each fiber terminates vertically at the undersurface of the xerographic plate as do all subsequent rows. For purposes of clarity, the fibers in FIG. 11 are shown in somewhat exploded relation to each other, it being understood that they are actually arranged in close contiguous relation. The second row, designated 2, extends parallel lengthwise with the first row, but emanating from the bottom is angularly offset a predetermined angle in a first direction on the order of 5 to 45 degrees, usually 30°. The third row designated 3, in the direction of block length is parallel to the second row but emanating from the bottom is angularly offset from the vertical on equal angle in a direction opposite from the offset angle of the second row. The fourth row of fibers, designated 4, is in all respects substantially parallel to the first row. The first and fourth rows extend perpendicular to the xerographic plate above such that with this arrangement, optical transmission to the first and fourth rows is transmitted in correspondence as received. Transmission to the second and third rows are offset angularly from the optical axis to effect image distortion relative to rows 1 and 4 in only one dimension of the image, in this case being lengthwise.

Referring specifically to the embodiment of FIG. 11, overlying the light emitting ends of the fiber bundle in contiguous relation and extending perpendicular thereto is the xerographic plate 57. The plate comprises a transparent conductive layer 76 on which is supported a layer of photoconductive material 77 which may be any of the well known photoconductive materials as vitreous selenium, sulfur, anthracene or other organic photoconductors as well as dispersions of photoconductive pigments such as zinc oxide in various resins or other electrically insulating binder materials. Layer 77 is generally characterized as being a good electrical insulator capable of maintaining a surface charge in the dark, and becoming substantially more conductive when illuminated by visible light, X-rays, or other forms of activating radiation. Vitreous selenium of about 50 micron thickness was found to be preferred. Suitable materials for layer 76 includes a conductive coating such as tin oxide, thin layers of copper iodide, gold, or the like.

As can be seen from FIG. 11, the fibers are generally cylindrical in cross section on the order of about 0.010" in diameter and bonded together into a rigid structure by means of a suitable bonding material 63 such as a clear epoxy. As can be appreciated, the areas below the xerographic plate corresponding to the binder material between the fibers do not image onto the xerographic plate and therefore do not effect an electrical discharge in these areas. In order to prevent these undischarged plate areas from subsequently being developed there is included a screened interface in the form of a dot pattern 78 between layers 76 and 77 comprising an electrically insulating material of about 5 microns in thickness. These dots, which are superimposed over the ends of the fibers give a non-injecting contact and act to reduce dark conductivity to prevent premature charge dissipation of the photoconductor as for example, described in Stockdale copending application Serial No. 118,626 filed June 21, 1961. The dot material is omitted in areas overlying the binder material effecting high dark discharge thereat. Hence, in the absence of light, the plate has very low, dark conductivity in areas of the photoconductor immediately above the dot material, but at the same time has a relatively high dark conductivity in those areas corresponding to the interstices of the dots. By this arrangement, the areas over the screened interface will retain its low dark conductivity and become discharged only as the light fibers therebelow become illuminated. At the same time, all areas corresponding to the areas of binder lose their charge prior to development by virtue of the high dark conductivity properties thereat. Consequently, all areas representative of background, in contrast to the image, become discharged by either light transmitted through the fibers or by the high discharge regions between fibers. This results in a uniformly discharged plate free of electrical fields except in the image areas.

Referring now to FIG. 13, there is provided instead a uniform interfacial layer of similar material as dots 78 overlying a conductive coating 76 on a transparent substrate 75. A thin diffusing screen 94 and a spacer 95 of about 0.01 inch is supported between the ends of the fibers and the xerographic plate to form an air space 97. This construction has been found to defocus the fine structured fiber pattern to overlap the binder areas and enable discharge of substantially all plate areas. By the arrangement of either FIGS. 11 or 13, it has been found that the electrostatic image produced on the surface of the photoconductive layer 77 corresponds very closely to the information originating from the original copy 20.

Figure 14:
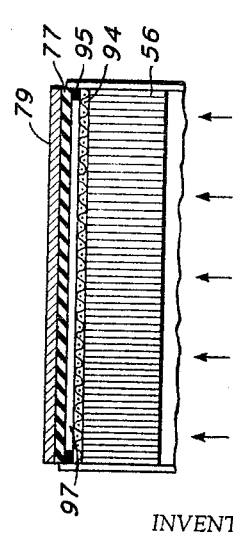
FIG. 14 is a sectional view of a scrambling block adapted partially to be utilized remote of the apparatus.

In the scrambling block embodiment of FIG. 14 the selenium layer 77 on a conductive stubstrate 79 of aluminum or the like is loosely supported on spacers 95. Light transmission is through the fiber bundle as shown by the arrows through diffusing screen 94 and air space 97. Charging, development and transfer is effected remote from the unit described above by removing the selenium plate and utilizing apparatus adaptation as disclosed, for example, in Sabel et al. patent U.S. 2,600,580.

In operation and utilizing the scrambling block embodiments of FIGS. 11 and 13, a copy 20 having information to be encodified onto a support is placed in the object plane of copyholder 11. Depressing push button PB–1 on the side of the housing (FIGS. 2 and 3) is effective through timer 96 to energize corona generating device 65 which places a uniform electrostatic charge on the xerographic plate. Depressing push button PB–2, also under control of timer 96, effects illumination of lamps LMP–1 and LMP–2 to illuminate the copy and effect an optical transmission through lens 40 and mirror 42 to the encoding device 55. The radiation transmitted thereby produces an electrostatic latent image on photoconductive surface 77. By raising gate 82 a predetermined quantity of developer 80 is permitted to cascade over the plate surface to develop the electrostatic latent image. Spring stop 74 is released and arms 71 are then pivoted clockwise whereat the unit is held by stop 73 to give free access to the developed image on the plate. The image can then be adhesively transferred as described above, or a receiving surface such as a sheet of bankbook 90 can be placed superposed over the developed image to effect transfer. With the latter, the unit is pivoted counterclockwise to its normal position and the image is electrostatically transferred by energizing generating device 65. Where transfer has been by adhesive techniques, the adhesive bearing image can be placed directly onto the receiving surface while where by electrostatic techniques, the image is subsequently fused thereto.

By the above description, there has been disclosed a novel method and apparatus for encodifying graphic information from an original copy onto a receiving surface. The encodified information can easily be read out by means of an optical decoder having a reverse optical arrangement as that of encodifying device 55. The decoder forms no part of this invention. The advantages of such a coding method are many and are not intended to be limited to the banking situation described.

Since many changes could be made in the above construction and many apparently widely different embodiments of this invention could be made without departing from the scope thereof, it is intended that all matter contained in the drawings shall be interpreted as illustrative and not in a limiting sense.

What is claimed is:

1. An image encodifying unit for encoding an optical transmission of a graphic image original comprising:
    (a) a plurality of contiguously aligned fiber optic members at least some of which extend in a predetermined angular displacement from an optical axis of image transmission;
    (b) a binder material surrounding said fibers adapted to maintain the fibers in permanent alignment relative to each other;
    (c) a light sensitive layer contiguous to the emitting ends of said fiber optics adapted to form a developable latent image in response to radiation emission through said fiber optic members and,
    (d) means effective concomitantly with radiation emission from said fibers to affect said light sensitive layer in areas corresponding to said binder material similarly as affected by radiation in the areas of said fibers.

2. The encoder unit according to claim 1 in which the last recited means thereof comprises a diffusion screen supported intermediate the light emitting ends of said fibers and said light sensitive layer to effect a light diffused pattern of an image original which overlaps the cross-sectional areas between said fibers represented by said binder material.

3. Apparatus for encodifying graphic information onto a support surface comprising in combination:
    (a) copy support means for supporting original copy of graphic information to be encoded;
    (b) an optical exposure system for projecting a radiation image of copy from the copy on said copyholder;
    (c) an image encoder optically aligned with said projection system to receive the projected image from said optical system and including:
        (1) a plurality of contiguously aligned individual fiber optic members at least some of which extend in a predetermined angular displacement from the optical axis of the optical system; and,
        (2) a xerographic plate comprising a photoconductive insulating layer on a conductive substrate at the imaging plane extending approximately perpendicular to the optical axis contiguous to the light emitting ends of said fiber optics;
    (d) corona charging means supported opposite the xerographic plate and operative when energized prior to exposure for applying a uniform electrostatic charge onto said plate,
    (e) developing means operative after exposure for applying a quantity of electroscopic developer particles to effect a visible development of the electrostatic image formed on exposure; and,
    (f) means operatively connected to said charging means to energize said charging means for a first time period to effect said plate charging and operative for a second time period after development with a support surface overlying the developed image to apply charge to the backside of said support surface and electrostatically transfer the developed image from the xerographic plate to said support surface.

4. The apparatus according to claim 3 in which the xerographic plate of said encoding unit comprises vitreous selenium.

5. The apparatus according to claim 4 in which the substrate of said xerographic plate is transparent and is arranged to receive the light transmission from said fiber members.

6. An image encodifying unit for encoding an optical transmission of a graphic image original comprising in combination:
    (a) a plurality of contiguously aligned fiber optic members at least some of which extend in a predetermined angular displacement from an optical axis of image transmission;
    (b) a binder material surrounding said fibers for maintaining the fibers in permanent alignment relative to each other;
    (c) a xerographic plate including a photoconductive layer on a conductive substrate overlying the emitting ends of said fiber optics and adapted when charge sensitized to dissipate charge in response to radiation emission through said fiber optic members; and
    (d) means to dissipate charge from said photoconductive layer in areas thereof corresponding to the binder between said fibers.

7. The encoding unit according to claim 6 in which the last recited means thereof comprises:
    a diffusion screen supported intermediate the light emitting ends of said fibers and said photoconductive layer to effect a light diffused pattern of an image original to overlap the cross-sectional areas between said fibers represented by said binder material.

8. The encoding unit according to claim 6 in which the last recited means thereof comprises:
    a geometrically arranged pattern of interfacial material supported between the conductive substrate and the photoconductive layer of said xerographic plate corresponding and superposed areawise to the cross-section at the light emitting ends of said fibers, said interfacial material being capable of effecting an electrical dark decay between the photoconductive layer when charged and said substrate in the areas of said fibers substantially lower than the interstices areas thereof corresponding areawise to the binder material surrounding said fibers.

References Cited by the Examiner
UNITED STATES PATENTS 3,051,044  8/1962  McNaney.
3,125,812  3/1964  Simpson _____ 88—24 X NORTON ANSHER, *Primary Examiner.*

RICHARD A. WINTERCORN, *Assistant Examiner.*